Patented June 2, 1953 2,640,764

UNITED STATES PATENT OFFICE 2,640,764

ETCHING

John A. Easley and Harry E. Swayze, Midland, Mich., assignors to The Dow Chemical Company, Midland, Mich., a corporation of Delaware No Drawing. Application February 12, 1951, Serial No. 210,615

13 Claims. (Cl. 41—42)

The invention relates to a method of etching metal. It more particularly concerns an improved method of producing a relief in the surface of an object of a metal easily soluble in acid, as in making a printing plate by etching with an acid solution.

In the conventional method of making a metal printing surface, as in making a photoengraving of an acid-soluble metal such as magnesium, zinc, and their alloys, a light sensitive coating or "enamel" is applied to the metal surface which is usually flat or cylindrical. The coated surface is exposed to light through a negative having an image therein so as to produce a corresponding image in the coating. The exposed coated surface is "developed" forming an acid resistant coating in the form of the image produced by the exposure. The acid resistant coating, which is referred to as a resist, is usually further hardened as by a hardening treatment which increases its resistance to the etching acid. The surface of the metal bearing the so-prepared resist is then subjected to etching by an acid.

The etching is usually carried out with nitric acid suitably diluted with water, the acid solution being usually splashed or otherwise projected against the object. The acid solution attacks the bare portions of the metal, that is, the portions of the object denuded of the light sensitive material in the developing operation. The rest of the metal surface is protected by the resist from direct attack by the acid which does not penetrate the resist. As the etching proceeds, metal from the bare portions of the object dissolves away leaving the image in vertical relief. As soon as a moderate depth of etch is made in this way attack by the acid in a lateral direction on the metal supporting the acid-resisting image becomes noticeable and the resist may be undercut slightly around its edges. Before a significant amount of the metal forming the relief is dissolved away by lateral attack, the etching solution is rinsed off, the rinsed object is dried, and the dried object is then treated to protect the meal relief from lateral attack by the acid when the object is subjected to further etching. One method of providing this protection is to powder the object in each of four directions, i. e. N. S. E. and W. with an acid-resisting powdered material called "etching powder" so as to coat with the powder all sides of the portions of the metal in relief. After each powdering the powder is "burned in," that is, the powdered etched object is heated to fuse and fix the acid-resisting material in place as an acid resistant coating. The object thus protected by powdering or otherwise is then given a second etch. This etch increases the depth of the prior etch without attack on the metal already in relief, the sides of which are protected from the acid.

The second etch, like the first, is stopped before a significant amount of attack is produced on the sides of the relief below the protected portion, and, as before, the etched object is again rinsed, dried, and given a protective treatment as by powdering so as to form an acid-resisting coating on all sides of the newly formed portion of the relief. The object is then ready for a third etch which is carried out in a manner similar to the preceding etches. The object is thus alternately subjected to etching, protecting of the relief, and etching so as to accentuate the relief while restraining attack by the acid on the image-supporting metal in relief, until a sufficient depth of etch is produced in the surface of the object not coated with resist to meet printing requirements. The number of etches made by the acid or "bites," as these etches are called in the trade, is usually three, four, or five depending upon the character of the image and the depth of etch required. The foregoing steps are well-known in the art and are practiced in various ways best adapted to the work in hand.

Although the acid etches away the metal rapidly, the time taken for the entire operation of completing the preparation of the printing surface, when several bites are to be made, is inordinately large. This is due mainly to the numerous time-consuming steps of rinsing, drying, and protecting the relief which are required between each bite of the etcher to prevent undercutting the image while obtaining a sufficient depth of etch for printing purposes and are more time-consuming than the etching operation itself.

It is the principal object of the invention to provide a method of preparation of a metal relief by etching with acid, as in the preparation of a printing surface, which may be carried out with dispatch. Another object of the invention is to reduce or prevent the attack of the acid on the metal in relief under an acid resist and thereby reduce or eliminate the need for interposing one or more protective treatments, e. g. powdering and burning in, to save the relief from lateral attack as it forms during etching. Other objects and advantages will become apparent during the description of the invention.

The invention is predicated upon the discovery that by including in the acid etching bath, and impinging the bath composition against the object to be etched, certain agents which produce a removable acid resistant film that exerts a controlling effect on the dissolving action of the acid, the dissolving action of the acid normal to the surface of the work is not adversely affected while the dissolving action laterally, that is, in a direction which tends to dissolve away metal in relief and undercut the resist, is substantially reduced. As a result, there is obtained a deeper etch without significant loss in area of surface in relief and one or more, if not all, protective treatments, applied after the relief forms to prevent lateral etching of the relief, may be eliminated. The elimination of more or less, if not all the protective treatments, results in faster production of a finished etched object and substantial savings in both labor and materials.

In connection with evaluating the effects of the agents added to the acid etching bath according to the invention for controlling the etching action of the acid, the term "etch factor" is used. This term is defined as the ratio of the depth of the etch adjacent to a line of resist to one-half the loss in width of metal at the top of the surface of the relief beneath the line of resist. The etch factor affords a measure of the amount of attack by the acid laterally (i. e. parallel to the surface bearing the relief) compared to the amount of attack downwardly (i. e. normal to the surface bearing the relief). The etch factor varies to some extent with the area of the bare metal exposed to the etcher as well as the depth of etch. For purposes of making comparative tests, these variations may be ignored if the bare metal surface adjacent to the resist is at least 0.02 inch wide and the etch is carried to a depth of at least about 0.005 inch in each test.

In tests of nitric acid solutions consisting of from 1 to 50 per cent of $HNO_3$ in water by weight, the etch factors observed range from about 1.5 to about 7 using a magnesium-base alloy plate having a nominal composition of 3 per cent Al, 1 per cent Zn, 0.2 per cent Mn, the balance being magnesium and strongly impinging the acid solution against the plate, as by means of an air stream or splashing, until etched to a depth of about 0.010 inch.

By the present invention, the etch factor of the nitric acid etching bath is substantially increased, thereby making it possible to reduce, as already mentioned, the overall time required to produce the desired depth of relief in the metal surface.

In carrying out the invention, nitric acid diluted with water to a suitable concentration is used. It is generally not desirable to greatly dilute the acid as this reduces its rate of action on the metal. On the other hand, if insufficient dilution is employed, the action of the acid may be too severe and the resist may be injured, as when the concentration exceeds about 50 per cent of $HNO_3$ by weight. Concentrations in the range of 3 to 20 per cent of $HNO_3$ are generally most useful. A preferred range of concentrations is 5 to 10 per cent, while a concentration of 7 per cent of $HNO_3$ by weight is generally satisfactory.

In accordance with the invention, there is added to the suitably diluted (with water) nitric acid solution, an agent which increases the etch factor. Agents suitable for the purpose are esters of aliphatic acids having from 12 to 18 carbon atoms and polyhydric alcohols having from 2 to 6 carbon atoms, as for example sorbitol laurate, diethylene glycol mono-laurate, diethylene glycol mono-oleate, propylene glycol mono-laurate, or glycerol mono-laurate. Effective proportions vary over a wide range and depend upon the concentration of the $HNO_3$ in the diluted nitric acid solution in that the higher the concentration of the $HNO_3$ the greater the amount of ester required. Excessively large amounts of the ester tend to prevent the acid from etching while too small an amount fails to increase the etch factor. Amounts between these extremes may be used. As a quantitative illustration, there may be used from about 0.2 to 2.5 times as much ester by weight as the amount of $HNO_3$ in the diluted nitric acid solution.

The following examples are illustrative of the invention:

*Example 1*

A plate formed of a magnesium-base alloy having a nominal composition of 3 per cent of aluminum, 1 per cent of zinc, and 0.2 per cent of manganese, the balance being magnesium is coated with a conventional light sensitive enamel in the usual way and then exposed through a photographic negative having a series of parallel alternating opaque and transparent lines, the widths of the transparent lines being at least 0.12 inch. After the exposure, the plate is developed leaving a series of parallel lines of resist corresponding to the transparent lines of the negative with spaces of bare metal at least 0.12 inch wide between each line of resist.

An etching bath is made by mixing together dilute nitric acid and sorbitol laurate according to the formulation:

| | Parts by weight |
|---|---|
| 7% $HNO_3$ solution | 95 |
| Sorbitol dilaurate | 5 |

The mixture is maintained in an agitated state and impinged upon the plate to be etched, as by an atomizing nozzle using about 30 pounds per square inch air pressure. After 60 seconds, the impingement is stopped and the plate is rinsed and dried. The bare portions of the plate are found to be etched to a depth of 0.028 inch while the width of the lines has decreased but slightly, producing an etch factor of about 28.

The same concentration of nitric acid alone similarly used produces an etch factor of about 4.

*Example 2*

Using a plate similar to that of Example 1 and substituting diethyleneglycol mono-laurate for the sorbitol dilaurate in the etching bath of Example 1, the bare portions of the plate are etched to a depth of 0.033 inch in 60 seconds. An etch factor of about 50 is obtained.

*Example 3*

A plate similar to that of Example 1 is etched with an etching bath having the following formulation:

| | Parts by weight |
|---|---|
| 10% nitric acid solution | 95 |
| Diethyleneglycol mono-oleate | 5 |

The etching formulation is heated to 48° C. and impinged upon the plate for 30 seconds in similar manner to that of Example 1, then rinsed and dried. The bare portions are etched to a depth of 0.052 inch and an etch factor of about 44 is obtained. The same concentration of nitric acid solution similarly used alone produces an etch factor of 5.5.

*Example 4*

A plate similar to that of Example 1 is etched with an etching bath having the following formulation:

| | Parts by weight |
|---|---|
| 7.5% nitric acid solution | 91 |
| Propylene glycol laurate | 9 |

The etching formulation is impinged against the plate for 30 seconds at room temperature, then rinsed and dried. A bare portion adjacent to the resist is etched to a depth of 0.021 inch with but little undercutting. The etch factor is 8.7.

The same concentration of nitric acid solution similarly used alone produces an etch 0.0235 inch deep with an etch factor of about 4.

*Example 5*

A plate similar to that of Example 1 is etched with an etching bath having the following formulation:

| | Parts by weight |
|---|---|
| 7.1% nitric acid solution | 95 |
| Glycerol mono-oleate | 5 |

The etching formulation is heated to about 35° C. and impinged against the plate for 30 seconds. The plate is rinsed and dried. A bare portion adjacent to the resist is etched to a depth of 0.021 inch with an etch factor of 8.9.

*Example 6*

A plate comprising 99.2 per cent of zinc, the balance being 0.4 per cent Pb, 0.35 per cent Cd, 0.01 per cent Fe, and impurities, and bearing lines of resist similar to those of the plate of Example 1, is etched in a manner similar to that of Example 1, using the following formulation at room temperature:

| | Parts by weight |
|---|---|
| 7.5 per cent $HNO_3$ | 90 |
| Diethylene glycol mono-laurate | 10 |

After 60 seconds, the bare portions of the plate are etched to a depth of 0.023 inch and the etch factor obtained is about 39. The same concentration of nitric acid used alone in similar manmaner etches the bare portions to a depth of 0.0235 inch and produces an etch factor of about 4.

Although the examples specifically disclose impinging against the plate to be etched the etching bath mixture, by means of air atomization, it is to be understood that other ways and means of impinging the etching bath mixture against the work to be etched may be used, such as the splash method known in the art. In the usual splash method of impinging the etching acid upon the work to be etched a series of paddles beating the surface of the bath of acid splashes the acid against the work which is held above the bath in a position to receive the splash. The etching acid bath mixture after being splashed against the work drops back into the bath or against the paddles and is thus repeatedly flung at the work to be etched. At the same time, by means of the paddles, the etching bath is constantly agitated which operation ensures uniformity of admixture of the various components of the etching bath. Such mixing is desirable in the operation of the present method when the liquids involved are employed at temperatures at which miscibility is incomplete and two liquid phases are present in the etcher.

We claim:

1. An etching bath for etching an acid soluble metal comprising a mixture of an aqueous solution containing nitric acid and an ester of an aliphatic acid having from 12 to 18 carbon atoms and a polyhydric aliphatic alcohol having from 2 to 6 carbon atoms.

2. An etching bath for etching an acid soluble metal comprising a mixture of an aqueous solution containing from 3 to 50 per cent of $HNO_3$ by weight, and an ester of an aliphatic acid having from 12 to 18 carbon atoms and a polyhydric alcohol having from 2 to 6 carbon atoms, the amount of said ester being from 0.2 to 2.5 times that of the $HNO_3$ by weight in the aqueous acid solution.

3. An etching bath according to claim 2 in which the ester is sorbitol laurate.

4. An etching bath according to claim 2 in which the ester is diethylene glycol mono-laurate.

5. An etching bath according to claim 2 in which the ester is diethylene glycol mono-oleate.

6. An etching bath according to claim 2 in which the ester is propylene glycol mono-laurate.

7. An etching bath according to claim 2 in which the ester is glycerol mono-laurate.

8. In a method of etching an object of an acid soluble metal selected from the group consisting of magnesium, the magnesium-base alloys containing over 80 per cent of magnesium, zinc, and the zinc-base alloys containing over 90 per cent of zinc, said object having portions of its surface masked with an acid resistant coating, the step which consists in impinging upon the surface of the object so as to contact both the masked and unmasked portions thereof an aqueous solution which contains from 3 to 50 per cent of $HNO_3$, said solution having in admixture therewith an ester of an aliphatic acid having from 12 to 18 carbon atoms and a polyhydric aliphatic alcohol having from 2 to 6 carbon atoms, the amount of said ester being from 0.2 to 2.5 times that of the $HNO_3$ by weight in the aqueous solution.

9. In a method of etching an object of an acid soluble metal selected from the group consisting of magnesium, the magnesium-base alloys containing over 80 per cent of magnesium, zinc, and the zinc-base alloys containing over 90 per cent of zinc, said object having portions of its surface masked with an acid resistant coating, the step which consists in impinging upon the surface of the object so as to contact both the masked and unmasked portions thereof an aqueous solution which contains from 3 to 50 per cent of $HNO_3$, said solution having in admixture therewith a sorbitol laurate, the amount of said ester being from 0.2 to 2.5 times that of the $HNO_3$ by weight in the aqueous solution.

10. In a method of etching an object of an acid soluble metal selected from the group consisting of magnesium, the magnesium-base alloys containing over 80 per cent of magnesium, zinc, and the zinc-base alloys containing over 90 per cent of zinc, said object having portions of its surface masked with an acid resistant coating, the step which consists in impinging upon the surface of the object so as to contact both the masked and unmasked portions thereof an aqueous solution which contains from 3 to 50 per cent of $HNO_3$, said solution having in admixture therewith diethylene glycol mono-laurate, the amount of said ester being from 0.2 to 2.5 times that of the $HNO_3$ by weight in the aqueous solution.

11. In a method of etching an object of an acid soluble metal selected from the group consisting of magnesium, the magnesium-base alloys containing over 80 per cent of magnesium, zinc, and the zinc-base alloys containing over 90 per cent of zinc, said object having portions of its surface masked with an acid resistant coating, the step which consists in impinging upon the surface of the object so as to contact both the masked and unmasked portions thereof an aqueous solution which contains from 3 to 50 per cent of $HNO_3$, said solution having in admixture therewith diethylene glycol mono-oleate, the amount of said ester being from 0.2 to 2.5 times that of the $HNO_3$ by weight in the aqueous solution.

12. In a method of etching an object of an acid soluble metal selected from the group consisting of magnesium, the magnesium-base alloys containing over 80 per cent of magnesium, zinc, and the zinc-base alloys containing over 90 per cent of zinc, said object having portions of its surface masked with an acid resistant coating, the step which consists in impinging upon the surface of the object so as to contact both the masked and unmasked portions thereof an aqueous solution which contains from 3 to 50 per cent of $HNO_3$, said solution having in admixture therewith propylene glycol laurate, the amount of said ester being from 0.2 to 2.5 times that of the $HNO_3$ by weight in the aqueous solution.

13. In a method of etching an object of an acid soluble metal selected from the group consisting of magnesium, the magnesium-base alloys containing over 80 per cent of magnesium, zinc, and the zinc-base alloys containing over 90 per cent of zinc, said object having portions of its surface masked with an acid resistant coating, the step which consists in impinging upon the surface of the object so as to contact both the masked and unmasked portions thereof an aqueous solution which contains from 3 to 50 per cent of $HNO_3$, said solution having in admixture therewith glycerol mono-laurate, the amount of said ester being from 0.2 to 2.5 times that of the $HNO_3$ by weight in the aqueous solution.

JOHN A. EASLEY.
HARRY E. SWAYZE.

References Cited in the file of this patent

UNITED STATES PATENTS

| Number | Name | Date |
|---|---|---|
| 1,994,500 | Boller | Mar. 19, 1935 |
| 2,435,889 | Kerridge | Feb. 10, 1948 |
| 2,472,304 | Mason | June 7, 1949 |